United States Patent
Nagano et al.

(10) Patent No.: US 10,146,999 B2
(45) Date of Patent: Dec. 4, 2018

(54) VIDEO MANAGEMENT APPARATUS AND VIDEO MANAGEMENT METHOD FOR SELECTING VIDEO INFORMATION BASED ON A SIMILARITY DEGREE

(71) Applicant: Panasonic Intellectual Property Management Co., Ltd., Osaka (JP)

(72) Inventors: Keijiroh Nagano, Osaka (JP); Hiroki Sunagawa, Hyogo (JP); Yoshifumi Asao, Hyogo (JP); Masaharu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 81 days.

(21) Appl. No.: 15/295,198

(22) Filed: Oct. 17, 2016

(65) Prior Publication Data
US 2017/0116480 A1 Apr. 27, 2017

(30) Foreign Application Priority Data
Oct. 27, 2015 (JP) .................................. 2015-210323
Sep. 21, 2016 (JP) .................................. 2016-183566

(51) Int. Cl.
*G06K 9/00* (2006.01)
*G06K 9/62* (2006.01)
(Continued)

(52) U.S. Cl.
CPC ... *G06K 9/00758* (2013.01); *G06F 17/30241* (2013.01); *G06F 17/30781* (2013.01);
(Continued)

(58) Field of Classification Search
CPC ............. G06K 9/00758; G06K 9/6215; G06K 9/00476; G06T 7/70; G06T 7/60;
(Continued)

(56) References Cited

U.S. PATENT DOCUMENTS 5,610,822 A 3/1997 Murphy
2002/0047895 A1* 4/2002 Bernardo ............... G01C 11/02
348/48
(Continued)

FOREIGN PATENT DOCUMENTS

JP 6-144386 5/1994
JP 2000-029218 1/2000
(Continued)

*Primary Examiner* — Ming Y Hon
(74) *Attorney, Agent, or Firm* — McDermott Will & Emery LLP

(57) ABSTRACT

A video management apparatus includes a video database for holding a plurality of pieces of video information each associated with an image position, a geographic information database for holding a plurality of pieces of geographic information each indicating a position of a different one of spots on a map, and a controller. The controller extracts spots located within a first range from a current position as a first spot group, based on the current position and the plurality of pieces of geographic information. Further, the controller extracts spots located within a second range from the image position as a second spot group, based on the image position and the plurality of pieces of geographic information. Then, the controller selects video information from the plurality of pieces of video information, based on a similarity degree of the second spot group with respect to the first spot group.

14 Claims, 6 Drawing Sheets

(51) Int. Cl.
*G06T 7/60* (2017.01)
*G06F 17/30* (2006.01)
*G06T 7/70* (2017.01)

(52) U.S. Cl.
CPC ... *G06F 17/30784* (2013.01); *G06K 9/00476* (2013.01); *G06K 9/6215* (2013.01); *G06T 7/60* (2013.01); *G06T 7/70* (2017.01); *G06T 2207/30181* (2013.01)

(58) Field of Classification Search
CPC ..... G06T 2207/30181; G06F 17/30784; G06F 17/30781; G06F 17/30241
See application file for complete search history.

(56) References Cited

U.S. PATENT DOCUMENTS

| | | | |
|---|---|---|---|
| 2003/0095681 A1* | 5/2003 | Burg | G06F 17/3087 382/100 |
| 2006/0075442 A1* | 4/2006 | Meadow | G06F 17/30241 725/91 |
| 2007/0110316 A1 | 5/2007 | Ohashi | |
| 2007/0165968 A1* | 7/2007 | Terayoko | H04N 1/00132 382/305 |
| 2008/0306995 A1* | 12/2008 | Newell | G06F 17/30265 |
| 2009/0125223 A1* | 5/2009 | Higgins | G06T 7/246 701/532 |
| 2010/0060739 A1* | 3/2010 | Salazar | B64D 11/0015 348/148 |
| 2010/0250116 A1* | 9/2010 | Yamaguchi | G01C 21/3644 701/533 |
| 2010/0293224 A1 | 11/2010 | Moriwaki | |
| 2011/0242319 A1 | 10/2011 | Miyajima | |
| 2012/0257792 A1* | 10/2012 | Simon | G01C 11/06 382/103 |
| 2013/0107038 A1 | 5/2013 | Ota et al. | |
| 2014/0331259 A1* | 11/2014 | Araki | H04H 60/49 725/34 |
| 2015/0139608 A1* | 5/2015 | Theobalt | G11B 27/105 386/241 |
| 2017/0213086 A1* | 7/2017 | Cao | G06K 9/00718 |

FOREIGN PATENT DOCUMENTS

| | | |
|---|---|---|
| JP | 2006-279764 | 10/2006 |
| JP | 2007-194948 | 8/2007 |
| JP | 2011-227073 | 11/2011 |
| JP | 2011-242207 | 12/2011 |

* cited by examiner

| Name of Landmark | Geographic Information (Latitude, Longitude) |
|---|---|
| Mt. Fuji | (35°21'38"N, 138°43'40"E) |
| Skytree | (35°42'36"N, 139°48'39"E) |
| ⋮ | ⋮ |

VIDEO MANAGEMENT APPARATUS AND VIDEO MANAGEMENT METHOD FOR SELECTING VIDEO INFORMATION BASED ON A SIMILARITY DEGREE

BACKGROUND

1. Technical Field

The present disclosure relates to a video management apparatus and a video management method for selecting video information to be displayed in transportation means such as aircrafts and trains.

2. Description of the Related Art

PTL 1 discloses an image reproducing apparatus having a function of searching for and extracting past images captured at a position corresponding to a current position. Due to this configuration, past images captured at the position same as the current position can be seen.

CITATION LIST

Patent Literature

PTL 1: Unexamined Japanese Patent Publication No. 2006-279764

SUMMARY

The present disclosure provides a video management apparatus and a video management method capable of selecting a video image having a closer resemblance to a landscape viewed from the current position.

The video management apparatus according to the present disclosure includes a video database for holding a plurality of pieces of video information each associated with an image position, a geographic information database for holding a plurality of pieces of geographic information each indicating a position of a different one of spots on a map, and a controller. The controller extracts spots located within a first range from a current position as a first spot group, based on the current position and the plurality of pieces of geographic information. Further, the controller extracts spots located within a second range from the image position as a second spot group, based on the image position and the plurality of pieces of geographic information. Then, the controller selects video information from the plurality of pieces of video information, based on a similarity degree of the second spot group with respect to the first spot group.

Another video management apparatus of the present disclosure includes an interface for acquiring a plurality of pieces of video information each associated with an image position and a plurality of pieces of geographic information each indicating a position of a different one of spots on the map, and a controller. The controller extracts spots located within a first range from the current position as a first spot group, based on the current position and the plurality of pieces of geographic information. Further, the controller extracts spots located within a second range from the image position as a second spot group, based on the image position and the plurality of pieces of geographic information. Then, the controller selects video information from the plurality of pieces of video information, based on a similarity degree of the second spot group with respect to the first spot group.

The video management method of the present disclosure includes extracting spots located within a first range from a current position as a first spot group, based on the current position and a plurality of pieces of geographic information each indicating a position of a different one of spots on a map; extracting spots located within a second range from an image position as a second spot group, based on the image position and the plurality of pieces of geographic information, the image position being associated with each of a plurality of pieces of video information; and selecting video information from the plurality of pieces of video information, based on a similarity degree of the second spot group with respect to the first spot group.

The video management apparatus and the video management method in the present disclosure are effective for selecting video image having closer resemblance to scenery seen from the current position.

DETAILED DESCRIPTION

Hereinafter, the exemplary embodiments will be described in detail with reference to the accompanying drawings appropriately. However, detailed description beyond necessity may be omitted. For example, there is a case where detailed description of a matter already well-known and duplicate description of substantially the same configuration are omitted. This is done to avoid the following description being unnecessarily redundant, in order to facilitate the understanding of those skilled in the art.

Incidentally, the accompanying drawings and the following description are provided in order for those skilled in the art to fully understand the present disclosure, and are not intended to limit the claimed subject matter.

First Exemplary Embodiment

Hereinafter, a first exemplary embodiment will be described with reference to FIGS. 1 to 7.

[1-1 Configuration]

Figure 1:
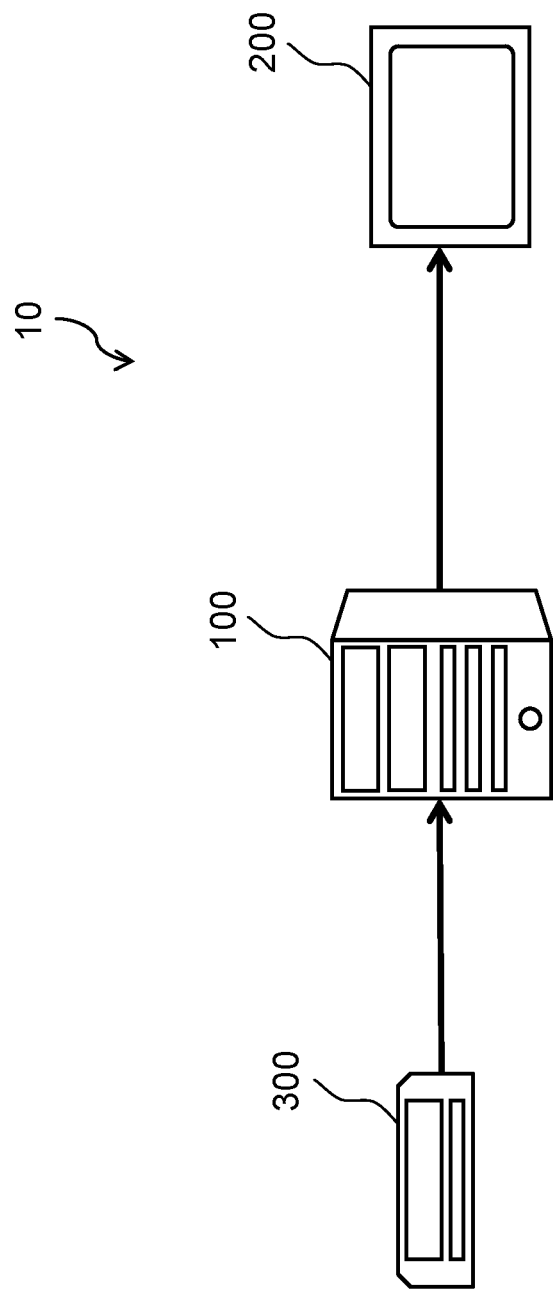
FIG. 1 is a diagram showing a configuration of an in-flight system in a first exemplary embodiment.

FIG. 1 is a diagram showing a configuration of in-flight system 10 according to the first exemplary embodiment. In-flight system 10 of the present exemplary embodiment is provided in an aircraft. In-flight system 10 holds a plurality of pieces of video data obtained by capturing images of landscapes outside the aircraft as video information when the aircraft is cruising along its route. In-flight system 10 selects, based on the current position of the aircraft, video data that are considered to have the closest resemblance to the scenery viewed from the current position from the plurality of pieces of video data, and displays images of the data.

In-flight system 10 includes server apparatus 100, monitor 200, and GPS module 300. Server apparatus 100 is connected to monitor 200, and transmits video data to monitor 200. Monitor 200 is mounted within the cabin of the aircraft.

Monitor 200 can display a video image based on the video data received from server apparatus 100. GPS module 300 acquires current position information indicating the current position of the aircraft and transmits the information to server apparatus 100.

Figures 2, 3:
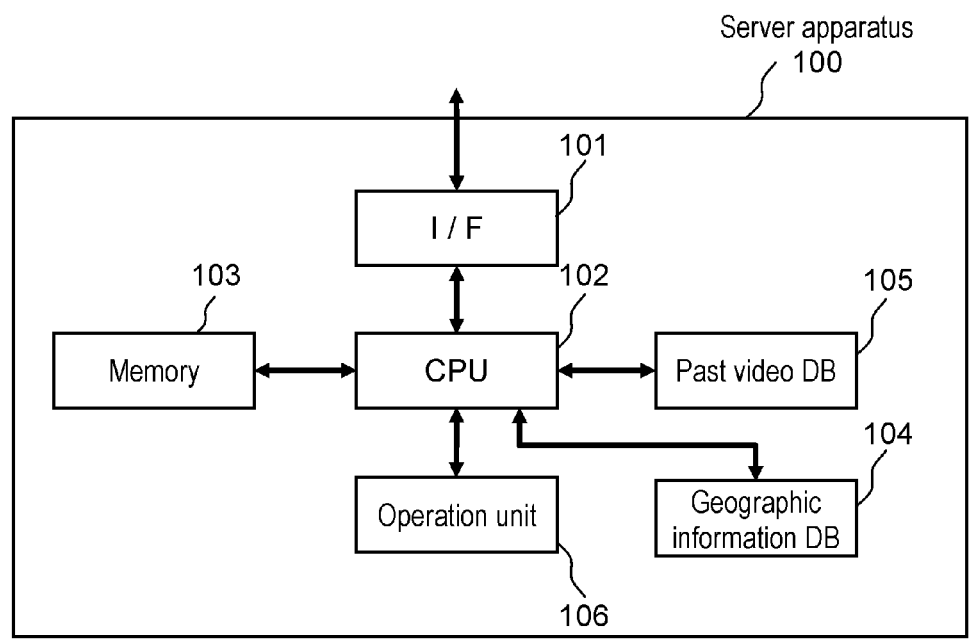
FIG. 2 is a block diagram showing a configuration of a server apparatus in the first exemplary embodiment.
FIG. 3 is a diagram showing data contents of a geographic information database in the first exemplary embodiment.

FIG. 2 is a diagram showing a configuration of server apparatus 100. Server apparatus 100 includes interface 101, CPU 102, memory 103, geographic information database 104, past video database 105, and operation unit 106. In the present exemplary embodiment, although a description will be given of geographic information database 104 and past video database 105 by taking configurations thereof connected to the interior of server apparatus 100 as examples, geographic information database 104 and past video database 105 only need to be configured such that CPU 102 can perform readout and writing of data with the databases. For example, these databases may be located outside server apparatus 100 in the aircraft, and may be connected with interface 101 of server apparatus 100. Further, these databases may be located also in a data center or the like outside the aircraft (on the ground), and may be capable of communicating with interface 101 of server apparatus 100 via wireless communication.

CPU 102 executes programs stored in memory 103, and performs various calculations, information processing and the like. CPU 102 can perform readout and writing with memory 103, geographic information database 104 and past video database 105. Further, CPU 102 communicates with monitor 200 and GPS module 300 via interface 101. CPU 102 collects information from GPS module 300, geographic information database 104 and past video database 105, and sends the video data to monitor 200 in accordance with a sequence to be described later. CPU 102 receives signals from operation unit 106 and performs various processing operations in response to the signals.

Memory 103 stores programs to be executed by CPU 102, a calculation result of CPU 102, information obtained from geographic information database 104, information obtained from past video database 105, and the like. Memory 103 is composed of a flash memory or a RAM.

Geographic information database 104 is a database that holds information on landmarks on a map (landmark information). The landmark information is information indicating positions of specific spots on the map, where landmarks are located. Note that the landmark is also called a point of interest (POI). Geographic information database 104 is constituted by a hard disk or the like.

FIG. 3 is a diagram showing a specific example of data contents held by geographic information database 104. Geographic information database 104 has a plurality of sets of the name of the landmark, and the latitude and longitude indicating the position of the landmark on the earth, as landmark information.

Past video database 105 is a database for holding, as past video data, a plurality of pieces of video data recorded by capturing images of scenery outside an aircraft when the aircraft is cruising along its route. The past video data is obtained by capturing images of landscapes outside the aircraft in advance with a camera mounted toward the outside of the aircraft and by recording the images as a moving image while the aircraft is cruising along the route. The camera can simultaneously capture images throughout the angle range of 360 degrees around the aircraft. That is, images of omnidirectional landscape seen from the aircraft are stored in each frame of the obtained past video data. When the aircraft flies in accordance with its route, there is a case where the aircraft cruises at a position shifted from a predetermined route under the influence of weather conditions or the like. Therefore, a plurality of pieces of past video data are held in past video database 105, the plurality of pieces of past vide data being obtained by capturing images of landscapes during the cruising along the route or different locations near the route. At the time of the image capturing, position information is simultaneously acquired with a GPS module or the like, and captured video data is associated with the position information and recorded.

Figure 4:
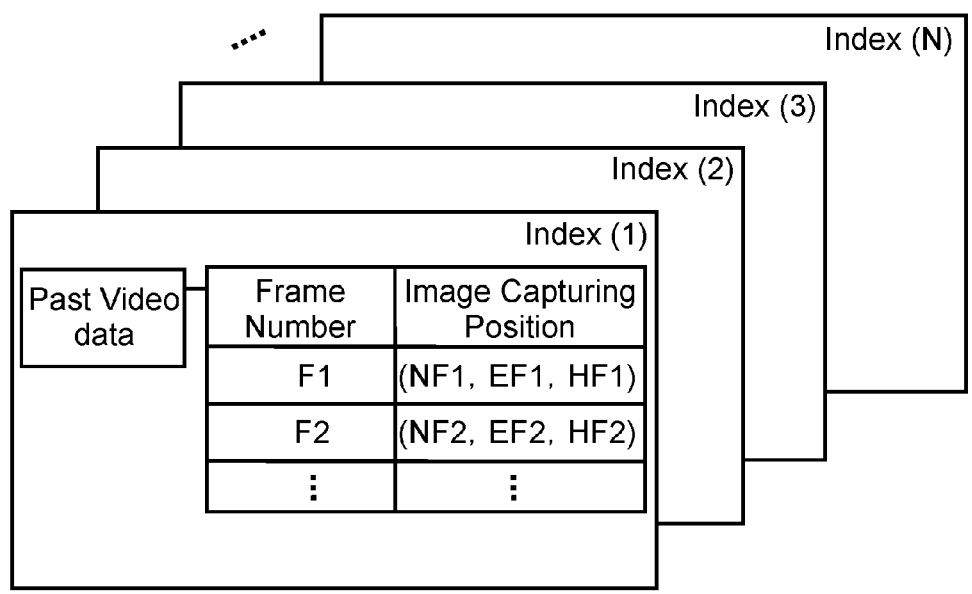
FIG. 4 is a diagram showing data contents of a past video database in the first exemplary embodiment.

FIG. 4 is a diagram showing the data contents in past video database 105. Past video database 105 includes a plurality of pieces of past video data obtained by capturing images in advance as described above, and in addition, holds indexes each of which associates the frame included in the past video data with image position information of each frame. Here, the past video data and the index are associated with each other and kept as a set. Specifically, this is a set in which the index associates a frame number with a latitude, a longitude and an altitude (image position information) that indicate the image capturing position where images of the frame are captured (i.e., position of the aircraft). The frame number, the latitude, the longitude, and the altitude are included in the past video data. Incidentally, the frame number may be any information that can identify the frame in the past video data, and may be a time code or the like instead of the frame number. In the present exemplary embodiment, as shown in FIG. 4, N sets of the past video data and the indexes are held in past video database 105.

Operation unit 106 is a user interface for accepting input from a user (cabin crew, etc. of an aircraft). Operation unit 106 is mounted in the cabin of the aircraft. Operation unit 106 is composed of at least one of a keyboard, a mouse, a touch panel, a remote controller and the like. When being operated by the user, operation unit 106 transmits a signal in response to the operation to CPU 102.

In-flight system 10 is an example of a control system. Server apparatus 100 is an example of the video management apparatus. GPS module 300 is an example of a position information acquiring unit. CPU 102 is an example of the controller. Interface 101 is an example of a communication circuit. The past video database is an example of a video database. The geographic information database is an example of a landmark database. The landmark information is an example of geographic information.

[1-2 Operation]

Figure 5:
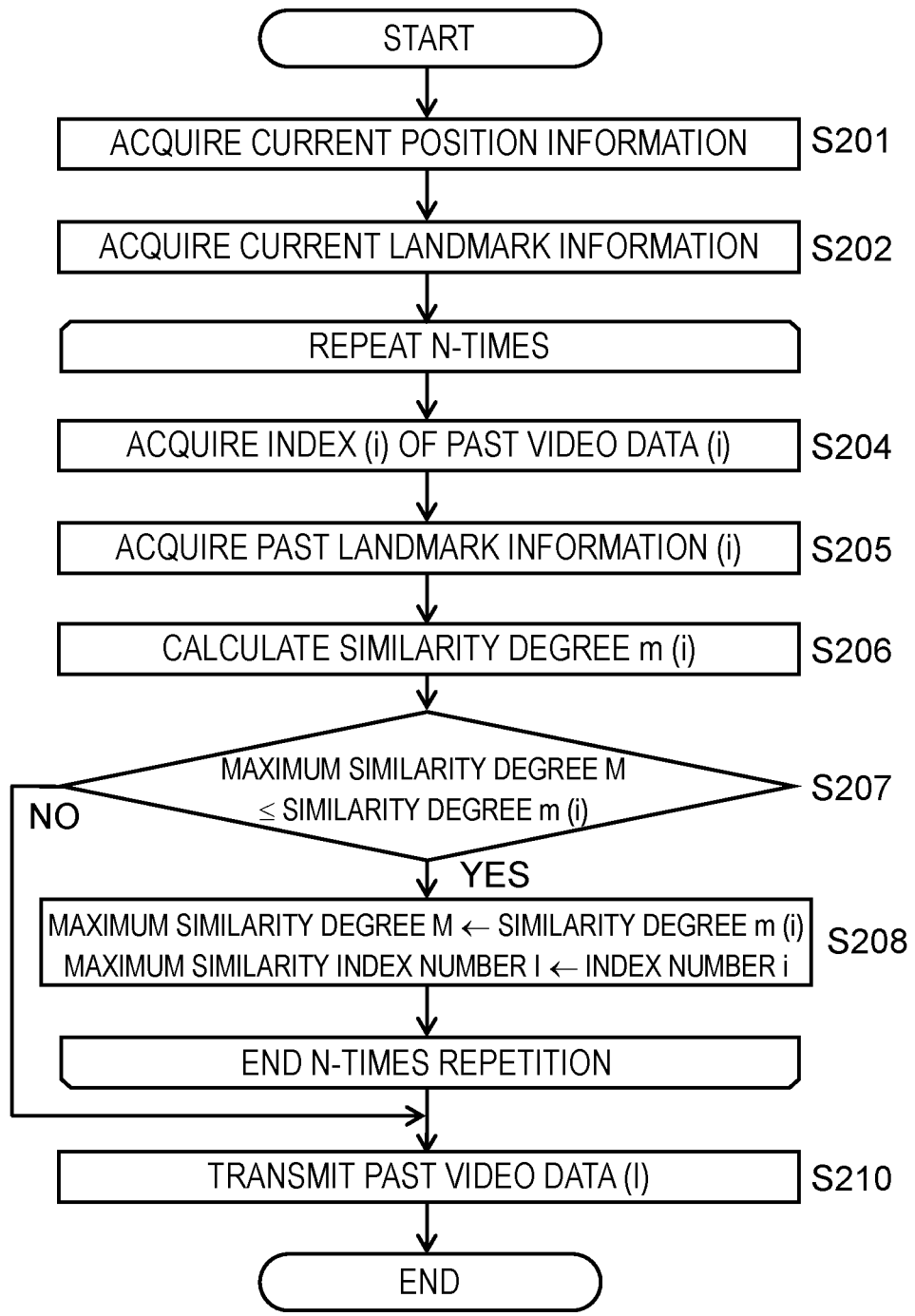
FIG. 5 is a flowchart for illustrating an operation of a server apparatus for selecting video data and for displaying the data on a monitor in the first exemplary embodiment.

Regarding in-flight system 10 configured as above, its operation will be described below. FIG. 5 is a flowchart illustrating an operation of server apparatus 100 selecting the video data and displaying the image of the data on monitor 200. When a cabin crew makes an instruction of starting the video display by operating operation unit 106 of the server apparatus 100, CPU 102 selects the video data to be displayed by performing the processing shown in FIG. 5, and displays video images based on the video data on monitor 200.

CPU 102 acquires the current position information from GPS module 300 (S201).

Then CPU 102 acquires the current landmark information, based on the current position information (S202). The current landmark information is information indicating landmarks that are present within a visible range from the current position of the aircraft. For acquisition of the current landmark information, CPU 102 first calculates a horizon distance of the current position. The horizon distance is the distance to the horizon on the sea (or the horizon on the land) as viewed from a position having a certain altitude from the ground. Assuming that the earth is a sphere of radius R, horizon distance D when the altitude of the current position indicated by the current position information is altitude h is calculated using equation (1) below.

[Expression 1]

$$D=\sqrt{2Rh+h^2} \quad (1)$$

In equation (1), horizon distance D becomes longer as altitude h is higher, which means that farther scenery can be viewed. Here, the position on the map indicated only by the latitude and longitude included in the current position information is referred to as the current position on the map and is distinguished from the current position (including the altitude). The range of the ground surface visible from the current position of the aircraft in flight can be roughly regarded as a range within a circle whose center is the current position on the map and whose radius is horizon distance D. Then, in the present exemplary embodiment, landmarks existing within the visible range from the current position of the aircraft are regarded as landmarks located within a circle whose center is the current position on the map and whose radius is horizon distance D, and then these landmarks are extracted. Hence, CPU 102 searches geographic information database 104 by using the current position information and acquires land mark information on landmarks located within a circle (first range) whose center is the current position on the map and whose radius is horizon distance D, as the current landmark information (first spot group).

CPU 102 selects the past video data having the most similar characteristics of the landscape which can be viewed from the current position, from N pieces of past video data held in past video database 105, by repeating the processing from step S204 to step S208 N times (the number of pieces of past video data).

First, CPU 102 acquires the index (index (i)) corresponding to the past video data (i) which is the i-th piece of the past video data from past video database 105 (S204). Here, index number i is increased by one for each repetition from 1 to N. The initial value of index number i is 1.

Figure 6:
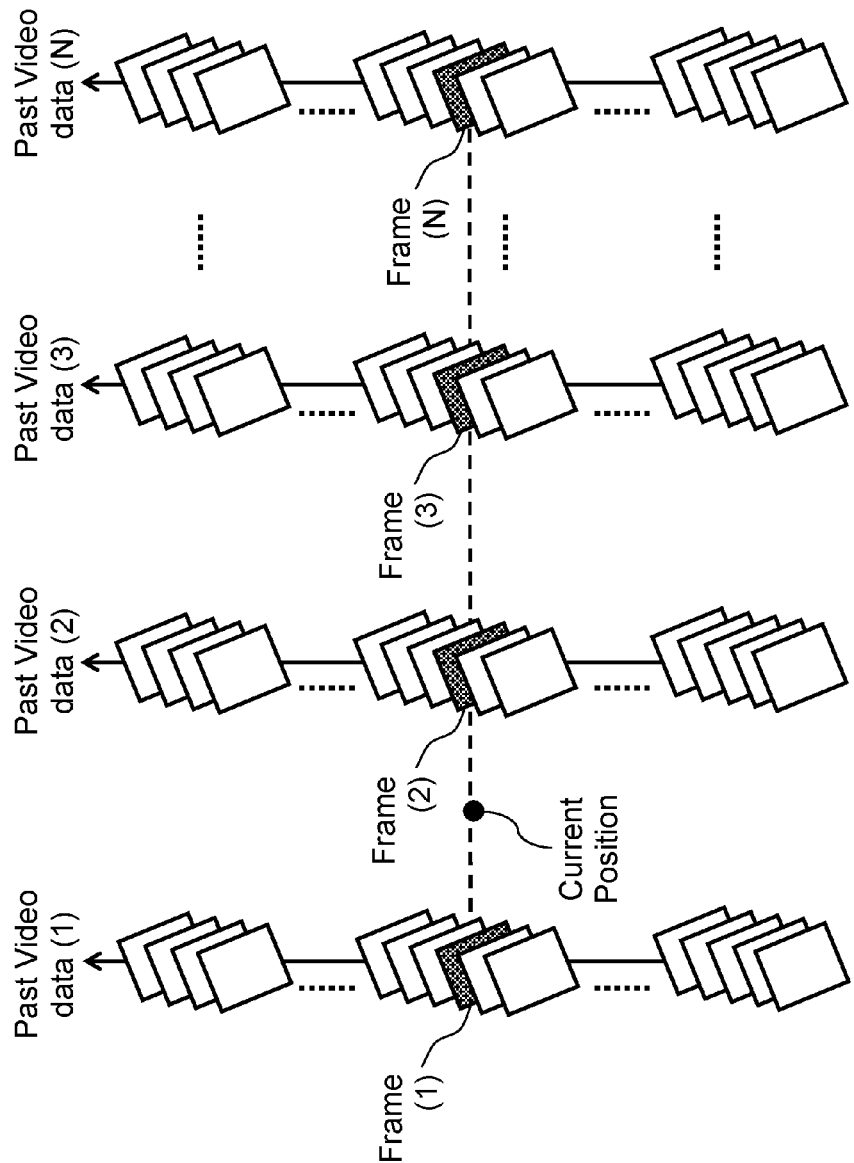
FIG. 6 is a diagram for illustrating how to choose a frame from past images in the first exemplary embodiment.

CPU 102 acquires the past landmark information (i) from landmark information held in geographic information database 104 and the acquired index (i) (S205). The past landmark information (i) is information on the landmarks existing within the visible range from the position which is closest to the current position and which is indicated by a piece of image position information among pieces of the image position information each corresponding to each frame of the past video data (i). Past landmark information (i) is acquired by identifying a frame whose image has been captured at the nearest position from the current position in the past video data (i), and identifying landmarks within the visible range from the image capturing position of the identified frame. FIG. 6 is a diagram illustrating a frame selected from a plurality of frames constituting the past video data. The position in FIG. 6 corresponds to the position on the map. The arrow directed from the bottom toward the top indicates a locus on the map at the time of capturing the past video data (locus of the aircraft cruising). Each rectangle drawn to be superposed on the arrow indicates a frame included in the past video data. The position of the rectangle corresponds to the image capturing position of the corresponding frame, that is, the position indicated in the image position information associated with the frame. N pieces of past video data (1) to (N) are shown in FIG. 6.

First, CPU 102 identifies the frame of past video data (i) associated with image position information indicating the position closest to the current position by comparing distances between the position indicated by each piece of image position information in index (i) and the current position. The frame identified in this way is defined as a frame (i), the image position information associated with the frame (i) is defined as image position information (i), and the altitude included in the image position information (i) is defined as altitude h (i), and the position indicated by the image position information (i) is defined as an image position (i). In addition, the image position (i) on the map represents the position on the map indicated by the latitude and longitude included in the image position information (i) associated with the selected frame (i). For example, as shown in FIG. 6, a frame whose position is closest to the current position in a past video data (1) is a frame (1). Similarly, the frames whose positions are closest to the current position in a past video data (2) to a past video data (N) are a frame (2) to a frame (N) respectively.

Then CPU 102 calculates horizon distance D (i) from altitude h (i) included in the image position information (i) of the selected frame (i) by using the equation (1). Then CPU 102 obtains landmark information on landmarks located in a circle (second range) whose center is the image position on the map (i) and whose radius is horizon distance D (i) as past landmark information (i) (second spot group) by searching geographic information database 104 by use of the image position information (i).

With reference back to FIG. 5, then, CPU 102 compares the current landmark information with the past landmark information (i), and calculates similarity degree m (i) (S206). Similarity degree m (i) is a ratio of the number of landmarks included both in the current landmark information and in the past landmark information (i) to the number of landmarks included in the current landmark information.

Figure 7:
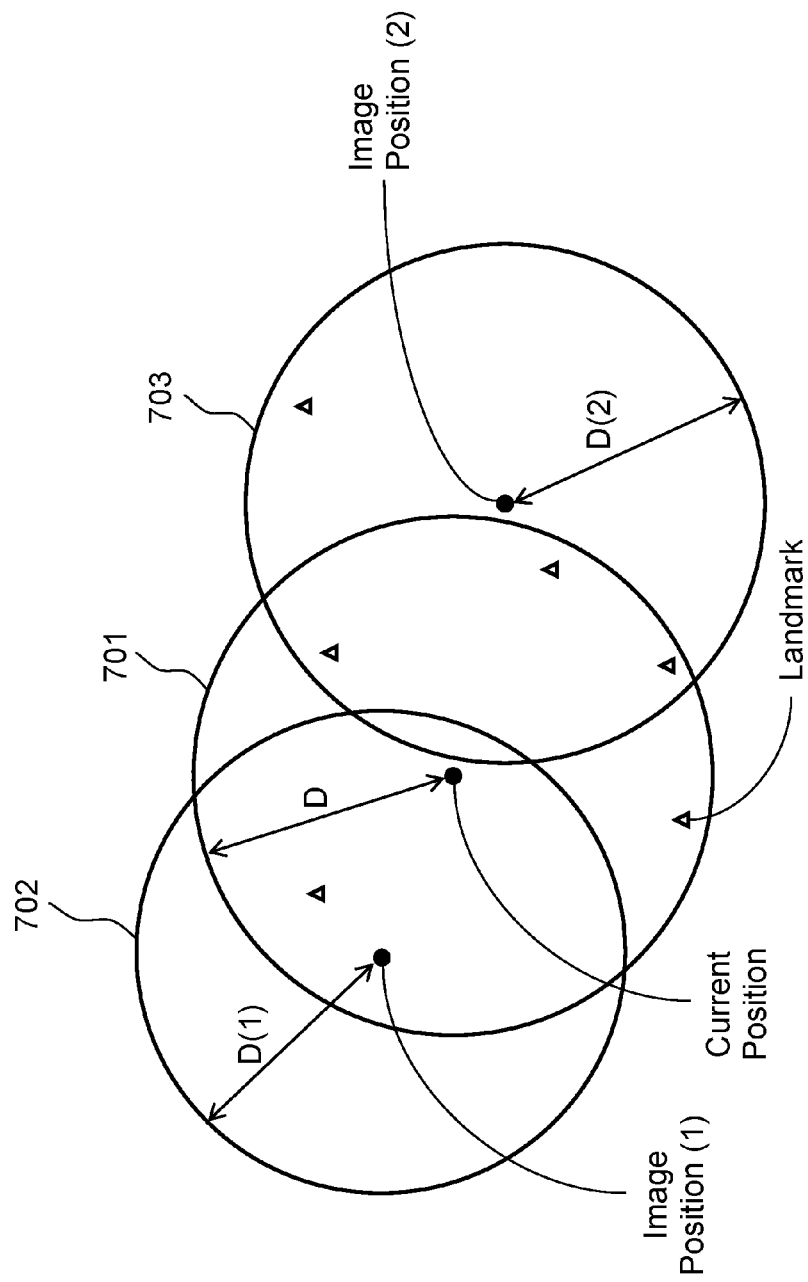
FIG. 7 is a diagram for illustrating a method of calculating a similarity degree in the first exemplary embodiment.

FIG. 7 is a diagram for illustrating a specific method of calculating the similarity degree. FIG. 7 illustrates a landmark as a triangle. Circle 701 is a circle whose center is the current position and whose radius is horizon distance D. That is, the landmarks corresponding to the current landmark information are landmarks existing within circle 701. Circle 702 is a circle whose center is the image position on the map (1) corresponding to the frame (1) contained in the past video data (1) and whose radius is horizon distance D (1). That is, the landmarks corresponding to the past landmark information (1) are landmarks existing within circle 702. Similarly, circle 703 is a circle whose center is the image position on the map (2) corresponding to the frame (2) contained in the past video data (2) and whose radius is horizon distance D (2). That is, the landmarks corresponding to the past landmark information (2) are landmarks existing within circle 703.

In the example shown in FIG. 7, the number of the landmarks included in the current landmark information is five. The number of landmarks included in the past landmark information (1) is one. The number of landmarks included in the past landmark information (2) is four. The number of landmarks included both in the current landmark information and in the past landmark information (1) is one. The number of landmarks included both in the current landmark information and in the past landmark information (2) is three. Therefore, similarity degree m (1) calculated is m (1)=1/5 (20%). Also, similarity degree m (2) calculated is m (2)=3/5 (60%). For specific calculation of the similarity degree, a method described above can be considered, but not limited to this. The similarity degree may be determined by the number of landmarks included both in the current landmark information and in the past landmark information.

With reference back to FIG. 5, then, CPU 102 compares similarity degree m (i) with maximum similarity degree M (maximum value of the similarity degree) (S207). When determining that similarity degree m (i) is equal to or higher than maximum similarity degree M (YES in step S207), CPU 102 substitutes similarity degree m (i) for maximum similarity degree M, and substitutes index number i for maximum similarity index number I (S208). Here, maximum similarity degree M denotes the maximum value of similarity degree m (i), and maximum similarity index number I denotes the index number of the past video data indicating maximum similarity degree M. The initial values of maximum similarity degree M and maximum similarity index number I are 0. Further, when determining that similarity degree m (i) is smaller than maximum similarity degree M (NO in step S207), CPU 102 performs the following repeated processing.

CPU 102 repeats processing from step S204 to step S208 N times (the number of pieces of the past video data), and then ends the repeated processing. At the time of completion of the repeated processing, the past landmark information (I) of the past video data (I) corresponding to maximum similarity index number I contains the most similar landmarks to the landmarks in the current landmark information. Therefore, CPU 102 selects the past video data (I) corresponding to the past landmark information (I) as past video data having the most similar characteristics to those of the landscape viewed from the current position. In the example shown in FIG. 7 in a case where the number of pieces of past video data is two (N=2), maximum similarity degree M finally becomes 60%, and maximum similarity index number I becomes 2 (I=2). Then CPU 102 selects the past video data (2) corresponding to the past landmark information (2) as the past video data having the characteristics most similar to those of the landscape viewed from the current position.

Finally CPU 102 transmits the past video data (I) associated with maximum similarity index number I obtained in the above repetitive processing to monitor 200 (S210). In this case CPU 102 transmits, to monitor 200, the frame (I) of the past video data (I) associated with the image position information indicating the position closest to the current position, and performs the processing shown in FIG. 5 for each frame, and thereby it is possible to select a frame to be displayed on monitor 200. However, in this case, past video data to be displayed will be switched for every frame; hence, there is a possibility that the video image becomes unnatural. Therefore, CPU 102, for example, selects a frame of the past video data by performing the processing shown in FIG. 5 at predetermined time intervals (e.g. 10 seconds) to start the display of a moving image after the frame. Then CPU 102 suppresses frequent switching of the past video data and allows more natural video display, by performing the next selection processing after a predetermined time has elapsed.

[1-3 Effects, etc.]

Server apparatus 100 of the present exemplary embodiment includes past video database 105 for holding a plurality of pieces of past video data each associated with an image position, geographic information database 104 for holding a plurality of pieces of geographic information each indicating a position of a landmark on the map, and CPU 102, as described above. CPU 102 extracts landmarks located within the first range from the current position as a first spot group, based on the current position and the plurality of pieces of geographic information. CPU 102, further, extracts landmarks located within the second range from an image position as a second spot group, based on the image position and the plurality of pieces of geographic information. Then CPU 102 selects past video data from a plurality of pieces of past video data, based on the similarity degree of the second spot group with respect to the first spot group.

Even when the current position of the aircraft deviates from the route, this server apparatus 100 selects a video image most similar to the scenery viewed from the current position and can display the image on monitor 200. That is, server apparatus 100 is effective for selecting the most similar video image to the scenery seen from the current position.

For example, when the aircraft is cruising in a bad weather, it is difficult for the passengers to see scenery outside the aircraft. Even in such a case, since the video image that is the most similar to the landscape which is supposed to be viewed currently is displayed on monitor 200, the passengers can enjoy the video image displayed on monitor 200 instead of the actual landscape.

Other Exemplary Embodiments

The first exemplary embodiment has been described above as an illustration of the techniques disclosed in the present application. However, the techniques in the present disclosure are not limited thereto, and are also applicable to exemplary embodiments for which modifications, substitutions, additions, and omissions, etc. have been carried out appropriately. Further, it is also possible to form a new exemplary embodiment by combining the respective components described in the first exemplary embodiment. Therefore, hereinafter, other exemplary embodiments are illustrated.

In the first exemplary embodiment, the past video data held in past video database 105 has been described as data holding images which have been captured previously. The past video data may be updated by capturing images each time during the cruising of the aircraft. In this case, a camera installed on the outside of the aircraft is connected to server apparatus 100, and the captured video data may be recorded in past video database 105 while being associated with the current position information acquired by GPS module 300. At this time, captured video data is preferentially held when the video data is captured at a position far from the image capturing positions of the past video data already held in past video database 105. In addition, when there are a plurality of pieces of video data captured at similar image capturing positions, the data may be replaced with one of these.

In the first exemplary embodiment, a description has been given of a configuration for obtaining past landmark information corresponding to the frame of the past video data every time in step S205 of the flowchart shown in FIG. 5. The past landmark information corresponding to the past video data is unchanged, as long as geographic information database 104 and past video database 105 are not updated. Accordingly, CPU 102 can acquire the past landmark information corresponding to each frame of each of the past video data in advance in accordance with the method shown in FIG. 5. In that way, the processing required for selecting the past video data to be displayed on the monitor 200 is reduced, and the processing time can be shortened. However, in this case, a storage medium (or for example, memory 103 or another storage medium) for storing the previously acquired past landmark information is required.

In the first exemplary embodiment, a configuration has been described in which image position information corresponding to each frame of the past video data is associated with the past video data and is held, as an index, in past video database 105. The image position information may be embedded directly to each frame of the past video data as metadata instead of being held in the index. In this case, it is necessary to read and search for the past video data to refer to image position information, and thus the configuration holding the image position information as an index separately as described in the first exemplary embodiment is desirable.

In the first exemplary embodiment, a configuration has been described in which CPU 102 calculates the similarity degree by acquiring the past landmark information for all (N pieces) of the past video data held in past video database 105. CPU 102 does not need to perform these processes for all of the past video data. In other words, these processes may be performed for a part of the past video data among a plurality of pieces of the past video data, and thus for example, the following may be performed. CPU 102 obtains the image position (i) of the frame (i) captured at the nearest position from the current position in the past video data (i) in step S205 in FIG. 5. Then when the distance between the image position (i) and the current position is equal to or more than the sum of horizon distance D and horizon distance D (i), CPU 102 does not carry out further processing to the past video data (i), and increases the index (i) by one and then performs the next repetition. This is because similarity degree m (i) can be regarded as zero, since the visible range from the image position (i) and the visible range from the current position do not overlap with each other.

In the first exemplary embodiment, an example has been described in which the similarity degree is the ratio of the number of landmarks included both in the current landmark information and in the past landmark information in common to the number of landmarks included in the current landmark information. The similarity degree can also be calculated by taking into account an importance degree set for each landmark. That is, when the landmark information that is geographic information contains an importance degree, the similarity degree is calculated after performing weighting in accordance with the importance degree for each extracted landmark. Here, the importance degree is a barometer showing noticeability, name recognition, or the like of the landmark, and for example, can be set on the basis of the data of the annual number of tourists visiting the landmark. Also, landmark may be divided into categories such as natural objects and buildings, and the importance degree may be set for each category. Further, the importance degree may be set high for a landmark whose visibility is high by quantitatively calculating its visibility from above, based on its spatial frequency, contrast, shape, etc. Further, the importance degree of a landmark related thereto may be set high, based on the information on the departure site and the destination.

In the first exemplary embodiment, a configuration in which server apparatus 100 includes memory 103 as a storage medium has been described. Server apparatus 100 may include other types of storage media as the storage medium. For example, server apparatus 100 may include a hard disk as a storage medium, and programs or the like executed by CPU 102 may be stored in the hard disk.

As described above, exemplary embodiments have been described as illustrations of the techniques in the present disclosure. For that purpose, the accompanying drawings and detailed description are provided.

Therefore, the components described in the accompanying drawings or detailed description are not only essential components for solving the problems, and some elements that are not essential for solving problems may also be included in order to illustrate the above techniques. Therefore, these unessential components should not be understood to be essential simply because these unessential components are described in the accompanying drawings and the detailed description.

Further, since the above-mentioned exemplary embodiments are intended to illustrate the techniques in this disclosure, various modifications, replacements, additions and omissions can be performed within the scope of the claims or scope of equivalents.

The present disclosure can provide a video management apparatus capable of selecting an image closer to the landscape viewed from the current position, and therefore, is applicable to the video management apparatus in an aircraft, a train or the like.

What is claimed is:

1. A video management apparatus comprising:
   a video database configured to store a plurality of pieces of video information each associated with an image position;
   a geographic information database configured to store a plurality of pieces of geographic information each indicating a position of a different one of spots on a map;
   an interface configured to obtain a current position; and
   a controller configured to:
     extract spots located within a first range from the current position as a first spot group, based on the current position and the plurality of pieces of geographic information,
     extract spots located within a second range from the image position as a second spot group, based on the image position, the plurality of pieces of geographic information and the current position,
     select video information from the plurality of pieces of video information, based on a similarity degree of the second spot group with respect to the first spot group, and
     generate a command signal for displaying the selected video information on a display device.

2. The video management apparatus according to claim 1, wherein
   the current position and the image position includes an altitude, and
   the first range and the second range are calculated based on the altitude.

3. The video management apparatus according to claim 2, wherein
   each of the first range and the second range is set by a circle whose radius is a horizon distance obtained by equation (1) below by using a radius of an earth when the earth is assumed to be a sphere and the altitude,

[Expression 1]

$$D=\sqrt{2Rh+h^2} \qquad (1)$$

where
   D: denotes the horizon distance
   R: denotes the radius of the earth when the earth is assumed to be the sphere, and
   h: denotes the altitude.

4. The video management apparatus according to claim 1, wherein the similarity degree is determined by a number of spots which the second spot group includes and shares with the first spot group.

5. The video management apparatus according to claim 1, wherein the plurality of pieces of geographic information include information indicating an importance degree associated with the spots, and the controller calculates the similarity degree based on the importance degree.

6. The video management apparatus according to claim 1, wherein the video information is at least one of a plurality of video frames.

7. A video management apparatus comprising:

an interface configured to acquire a plurality of pieces of video information each associated with an image position and a plurality of pieces of geographic information each indicating a position of a different one of spots on a map and a current position; and a controller configured to:

extract spots located within a first range from the current position as a first spot group, based on the current position and the plurality of pieces of geographic information, extract spots located within a second range from the image position as a second spot group, based on the image position, the plurality of pieces of geographic information and the current position, select video information from the plurality of pieces of video information, based on a similarity degree of the second spot group with respect to the first spot group, and generate a command signal for displaying the selected video information on a display device.

8. The video management apparatus according to claim 7, wherein the current position and the image position includes an altitude, and the first range and the second range are calculated based on the altitude.

9. The video management apparatus according to claim 8, wherein each of the first range and the second range is set by a circle whose radius is a horizon distance obtained by equation (1) below by using a radius of an earth when the earth is assumed to be a sphere and the altitude,

[Expression 1]

$$D=\sqrt{2Rh+h^2} \quad (1)$$

where

D: denotes the horizon distance

R: denotes the radius of the earth when the earth is assumed to be the sphere, and h: denotes the altitude.

10. The video management apparatus according to claim 7, wherein the similarity degree is determined by a number of spots which the second spot group includes and shares with the first spot group.

11. The video management apparatus according to claim 7, wherein the plurality of pieces of geographic information include information indicating an importance degree associated with the spots, and the controller calculates the similarity degree based on the importance degree.

12. The video management apparatus according to claim 7, wherein the video information is at least one of a plurality of video frames.

13. A video management method comprising:

obtaining a current position;

extracting spots located within a first range from the current position as a first spot group, based on the current position and a plurality of pieces of geographic information each indicating a position of a different one of spots on a map;

extracting spots located within a second range from an image position as a second spot group, based on the image position, the plurality of pieces of geographic information and the current position, the image position being associated with each of a plurality of pieces of video information;

selecting video information from the plurality of pieces of video information based on a similarity degree of the second spot group with respect to the first spot group; and generating a command signal for displaying the selected video information on a display device.

14. The video management method according to claim 13, wherein the video information is at least one of a plurality of video frames.

* * * * *